US005881955A

United States Patent [19]

Styne

[11] Patent Number: 5,881,955

[45] Date of Patent: Mar. 16, 1999

[54] SPRAYING DEVICE

[75] Inventor: James J. Styne, San Ramon, Calif.

[73] Assignee: Monsanto Company, St. Louis, Mo.

[21] Appl. No.: 837,352

[22] Filed: Apr. 17, 1997

[51] Int. Cl.[6] .............................. A01G 25/14; B05B 7/02; B05B 7/30

[52] U.S. Cl. .......................... 239/310; 239/318; 239/375; 239/407; 239/414; 239/526; 239/527; 239/569; 239/581.1

[58] Field of Search ..................................... 239/302, 310, 239/318, 375, 398, 407, 413, 414, 415, 525, 526, 527, 528, 569, 581.1

[56] References Cited

U.S. PATENT DOCUMENTS

| | | | |
|---|---|---|---|
| 2,006,437 | 7/1935 | Burgess et al. | 299/88 |
| 2,032,789 | 3/1936 | Bramsen | 239/527 |
| 2,599,678 | 6/1952 | Walker | 299/83 |
| 2,659,628 | 11/1953 | Beach | 239/526 X |
| 2,711,928 | 6/1955 | Randa | 299/84 |
| 2,760,820 | 8/1956 | Cirese | 299/83 |
| 2,887,272 | 5/1959 | Rosenthal | 239/414 X |
| 3,099,394 | 7/1963 | Lynn | 239/310 X |
| 3,104,823 | 9/1963 | Hayes | 239/304 |
| 3,164,114 | 1/1965 | Whitman et al. | 113/102 |
| 3,181,797 | 5/1965 | Hayes | 239/317 |
| 3,198,438 | 8/1965 | Hultgren et al. | 239/318 |
| 3,255,972 | 6/1966 | Hultgren et al. | 239/318 |
| 3,499,606 | 3/1970 | Smith | 239/304 |
| 3,554,450 | 1/1971 | D'Muhala | 239/309 |
| 3,915,191 | 10/1975 | Eisenthal et al. | 137/268 |
| 4,027,822 | 6/1977 | Usher | 239/305 |
| 4,475,689 | 10/1984 | Hauger et al. | 239/318 |
| 4,491,254 | 1/1985 | Viets et al. | 222/83.5 |
| 4,651,930 | 3/1987 | Magaha, Jr. | 239/318 |
| 4,878,619 | 11/1989 | Norman | 239/318 |
| 5,213,264 | 5/1993 | Styne | 239/309 |
| 5,320,288 | 6/1994 | Ketcham, Jr. | 239/310 X |
| 5,332,158 | 7/1994 | Styne | 239/310 |

FOREIGN PATENT DOCUMENTS

| | | |
|---|---|---|
| 569222 | 1/1988 | Australia . |
| 747129 | 12/1996 | European Pat. Off. . |
| 28537 | 2/1910 | United Kingdom . |
| 466093 | 5/1937 | United Kingdom . |
| 90/08456 | 8/1990 | WIPO . |

*Primary Examiner*—Andres Kashnikow
*Assistant Examiner*—Robin O. Evans
*Attorney, Agent, or Firm*—Arnold White & Durkee

[57] ABSTRACT

An improved spraying device for mixing a first fluid with a second fluid prior to dispensing into the environment. The spraying device includes a spraying head connected to a cartridge bottle. A shroud covers the spraying head to cartridge bottle connection. The chemical remains in a closed system even after the cartridge bottle is attached to the spraying head. A unique gear and/or cam system is provided to open the flow path of the second fluid and provide a positive operation. Also, the orifice diameter of the second fluid flow path is predetermined.

22 Claims, 7 Drawing Sheets

SPRAYING DEVICE

FIELD OF THE INVENTION

This invention relates to the field of chemical application. More specifically, the invention is an apparatus which dilutes and dispenses a chemical which is stored in an interchangeable cartridge, typically for lawn and garden application.

BACKGROUND OF THE INVENTION

There are many spray gun type applicators known in the art of lawn and garden chemical application. Typical hose end lawn or garden sprayers are aspirator units which apply fertilizers, pesticides or other chemicals at a fixed, low dilution ratio. To utilize concentrates which must be diluted to high ratios, the user normally predilutes the concentrate with water. This is accomplished by volume measurement of the concentrate with a spoon, cap or other measuring device into a sprayer mix jar. Water is then added to obtain the proper premix concentration. The prediluted concentrate is then further diluted to the final dilution ratio as the sprayer is operated.

Such predilution procedures require the manual handling of concentrated chemicals with its attendant risks. Moreover, the user must generally purchase the concentrate in larger quantities than are necessary for a single application and, thus, containers of the concentrated chemical must be stored for extended periods after they have been opened. On the other hand, devices which attempt to avoid predilution by diluting the concentrate at a high ratio in one (1) step are not satisfactory because of very poor accuracy. The concept of two-step mixing or dilution of chemicals, including such use in spraying devices is known. See, for example, U.S. Pat. Nos. 2,006,437; 2,599,678; 2,711,928; 2,760,820; 3,104,823; 3,181,797; 3,499,606; and 4,027,822. However, the devices shown in these patents are either cumbersome or otherwise unsuitable for garden spray devices. U.S. Pat. No. 3,165,114 issued to Garrett discloses a dispensing package of fluid soluble material capable of use with a standard feed mixer device. Some of the flowing water is diverted down through a nipple and inlet tube into the bottom of the package. Suction draws the dissolved material through an outlet tube. The device requires water to constantly flow through it, and does not provide a barrel valve which could shut off or control the flow.

U.S. Pat. No. 3,198,438 issued to Hultgren, et al. requires a trigger action to push a tapered plug out of an aperture, allowing water to flow into a mixing chamber to create a venturi suction to draw fluid out of a collapsible container. U.S. Pat. No. 3,255,972, also issued to Hultgren, et al. discloses a disposable container for use with sprayers of the type disclosed in the ’438 patent. U.S. Pat. No. 3,554,450, issued to D’Muhala teaches a spray gun which accommodates removable cartridges containing various solids or liquids. An end cap is unscrewed to control water through a mixing chamber and out a nozzle.

U.S. Pat. No. 3,915,191 discloses a water mixing device for a shower which may be fitted to the taps of a bath. A selector valve selectively permits water from an inlet chamber to flow through various enclosures of a second chamber. At least one (1) enclosure has a container to receive a soluble substance such as soap. No initial dissolution of the soap is provided for, and the soap is transported by direct flow of the water, and not drawn by aspiration.

U.S. Pat. No. 4,491,254 issued to Viets, et al. teaches an applicator for dispensing a chemical in dilute aqueous form.

The applicator has two (2) containers. The second container receives a chemical which has been diluted with water from the first container. A two-position, rotatable valve directs the flow of water into either the first container to predilute a chemical, or to flow across an aspirator to mix with the prediluted chemical and discharge it through the exit end of a passageway. Viet’s device requires removing caps from the containers to add chemicals, and to thread the containers together to attach them, a cumbersome and potentially unsafe procedure. The valve taught by Viets, et al. only has two (2) positions. Water is constantly flowing either into the second container to dilute a chemical or through the passageway. An operator must use a conventional nozzle, which must be specially adapted to attach to the applicator to turn the water on or off to control the flow.

U.S. Pat. No. 5,213,264 to Styne teaches a spraying apparatus having a sprayer head and a cartridge. A barrel valve controls whether an entering fluid flows directly into a mixing chamber, or flows through a tube into the cartridge, or does not flow at all. A membrane is required at the top of the cartridge, and is punctured by sprayer head tubes during attachment. U.S. Pat. No. 5,332,158 to Styne teaches a spraying device with an interchangeable cartridge. More specifically, U.S. Pat. No. 5,332,158 teaches a sprayer having a fluid inlet port which directs fluid into a mixing conduit. An aspirator port connects the mixing conduit with a second fluid in the cartridge. A vent port in the sprayer head connects with a vent in the cartridge to reduce the pressure differential in order to allow proper aspiration and reduce leaks. A nozzle means permits a controlled jet spray.

The prior work is limited in the attempts to easily, economically, safely, and environmentally provide a device to dilute and dispense various insecticides, herbicides, cleaners, and fertilizers. There is a need for a spraying device that keeps the chemical in a closed system until the operator engages the trigger. There is also a need for a sprayer in which the metering orifice is preset so that the end user does not have to worry about adjusting the water to chemical ratio.

SUMMARY OF THE INVENTION

The sprayer of the present invention has an unique trigger arrangement. In one embodiment, when an operator engages the trigger, a gear engages and rotates a ball valve gear, which in turn, rotates a ball valve thereby opening a water fluid path. Subsequently, in the same movement, the ball gear engages and rotates a fork gear which depresses a slider cam which, in turn, depresses a metering valve in the chemical fluid cartridge that opens a chemical fluid path. In the preferred embodiment, the trigger has an extension that engages one end of a cantilever. As the trigger engages one end of the cantilever, the other end of the cantilever engages a cam. The cam, in turn, engages and depresses a metering valve. The depressed movement of the metering cam opens the fluid path to the chemical cartridge. This structural arrangement provides a closed chemical system and maintains the closed system even after cartridge is assembled onto the sprayer, thus, creating a sprayer that is safer than prior art sprayers where the chemical path remains constantly open once the chemical cartridge is installed onto the sprayer. The unique gear arrangement also provides for a more positive operation than prior art sprayers.

The sprayer of the present invention also includes a premolded metering adapter wherein the orifice diameter is preset during manufacturing based on physical testing. Thus, the end user does not have to adjust the metering adapter. As a result, the sprayer becomes common to different applications and the end user simply uses different cartridges for different applications.

The sprayer of the present invention also includes an improved means of securing the cartridge shroud to the sprayer. The cartridge shroud is secured to the sprayer head by means of a bayonet fitting which is rotated onto the sprayer using a protruding slider cam as a means of orienting the cartridge to the sprayer. The cartridge bottle is then secured to the cartridge shroud by means of locking latches in the shroud which are secured under a valve closure threaded onto the bottle neck finish.

Figure 1:
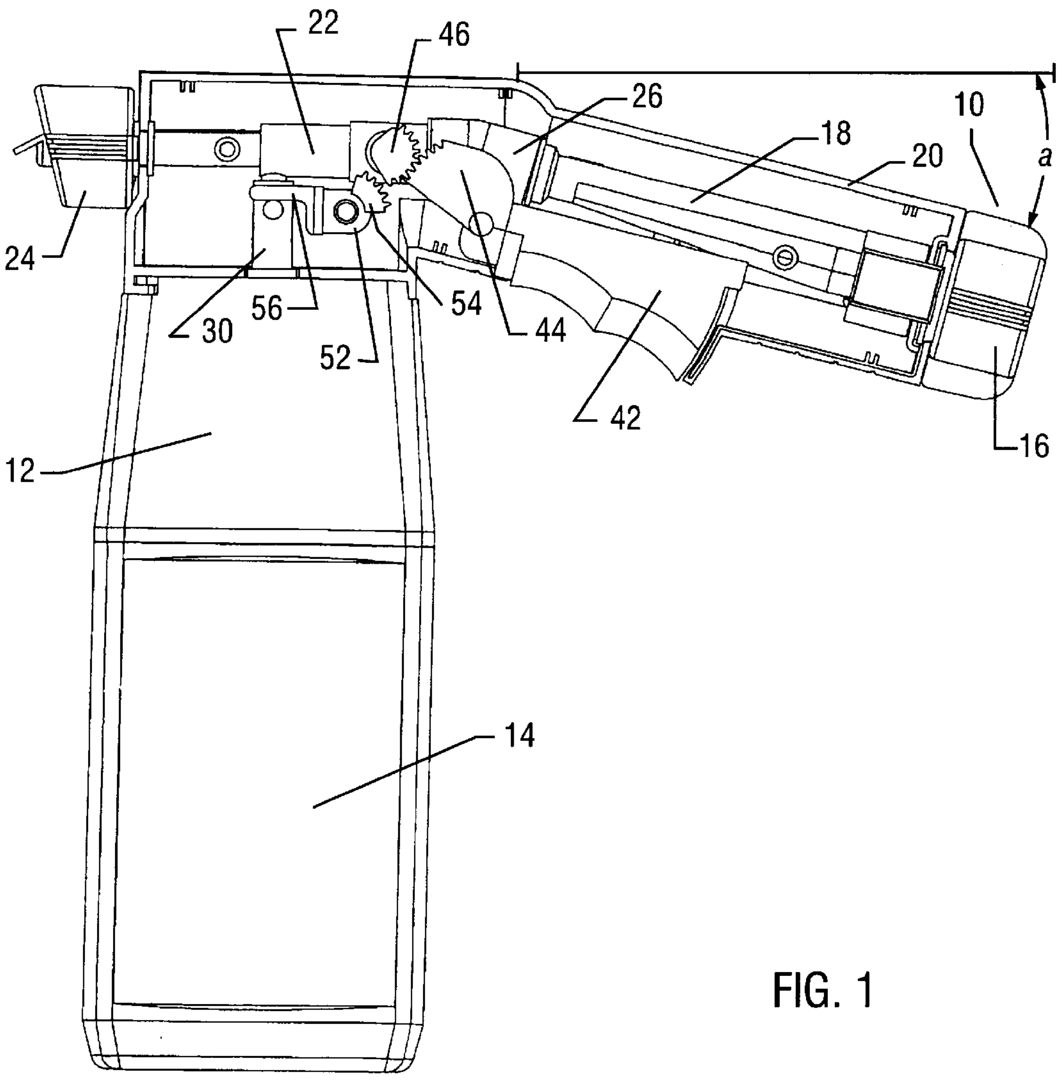
FIG. 1 is a side cut-away view an embodiment of the spraying device of the present invention showing the cartridge in the closed position.
Figure 2:
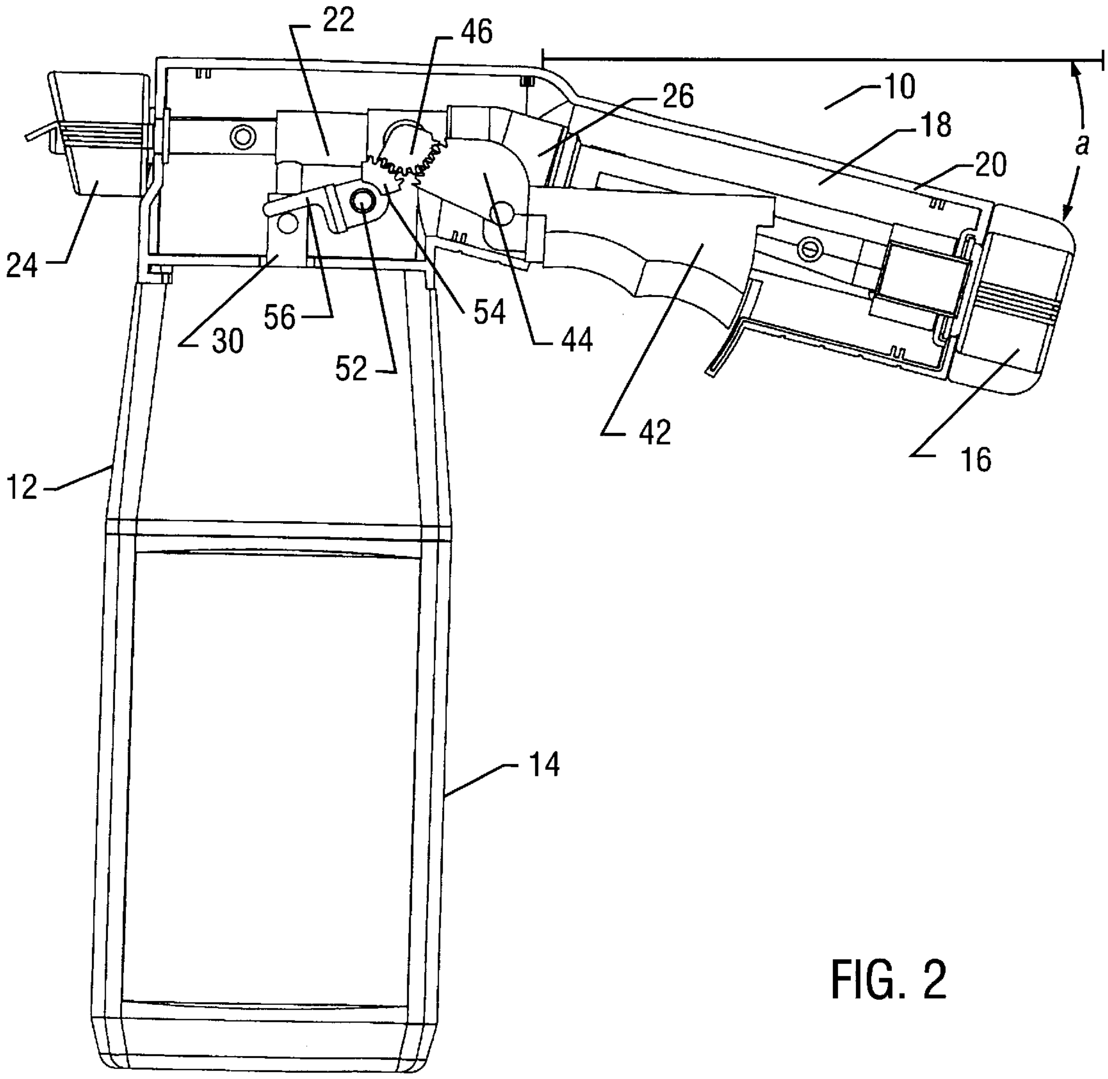
FIG. 2 is a side cut-away view of the embodiment of FIG. 1 showing the cartridge in the open position.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives following within the spirit and scope of the invention as defined by the appended claims.

DESCRIPTION OF ILLUSTRATIVE EMBODIMENTS

The spraying device of the present invention generally consists of three primary parts: (1) a spraying head, (2) a cartridge shroud, and (3) a cartridge bottle. FIGS. 1–4 and 7 illustrate one embodiment of the spraying device of the present invention. FIGS. 5 and 6 illustrate the preferred embodiment of the present invention.

Referring generally to either embodiment, sprayer head 10 is operatively secured to cartridge shroud 12, which in turn, is secured to cartridge bottle 14. A first fluid, typically water, enters into spraying head 10 through hose nut fitting 16 into fluid inlet conduit 18. Hose nut fitting 16 reduces leakage from the source of the first fluid, such as a garden hose, that enters the fluid inlet conduit 18. The hose nut fitting 16 may include an anti-siphon unit, which are well known in the art, for preventing back flow and leaking from fluid inlet conduit 18.

Fluid inlet conduit 18 is disposed in a housing 20, which provides support to sprayer head 10 to enhance fluid flow through the referenced conduits, ports and other passages. Any suitable material, such as plastic, may comprise the housing. The first end of fluid inlet conduit 18 is connected to hose nut fitting 16. The second end of fluid inlet conduit 18 is operatively connected to the first end of an outlet fluid conduit 22. The second end of the outlet fluid conduit is operatively connected to nozzle means 24 which provides a jet spray. It is desirable that nozzle means 24 be adjustable to spray up or down or to selectively provide a jet spray. Nozzle means are well known in the art. Outlet fluid conduit 22 is, like inlet fluid conduit 18, disposed in housing 20.

Figure 4:
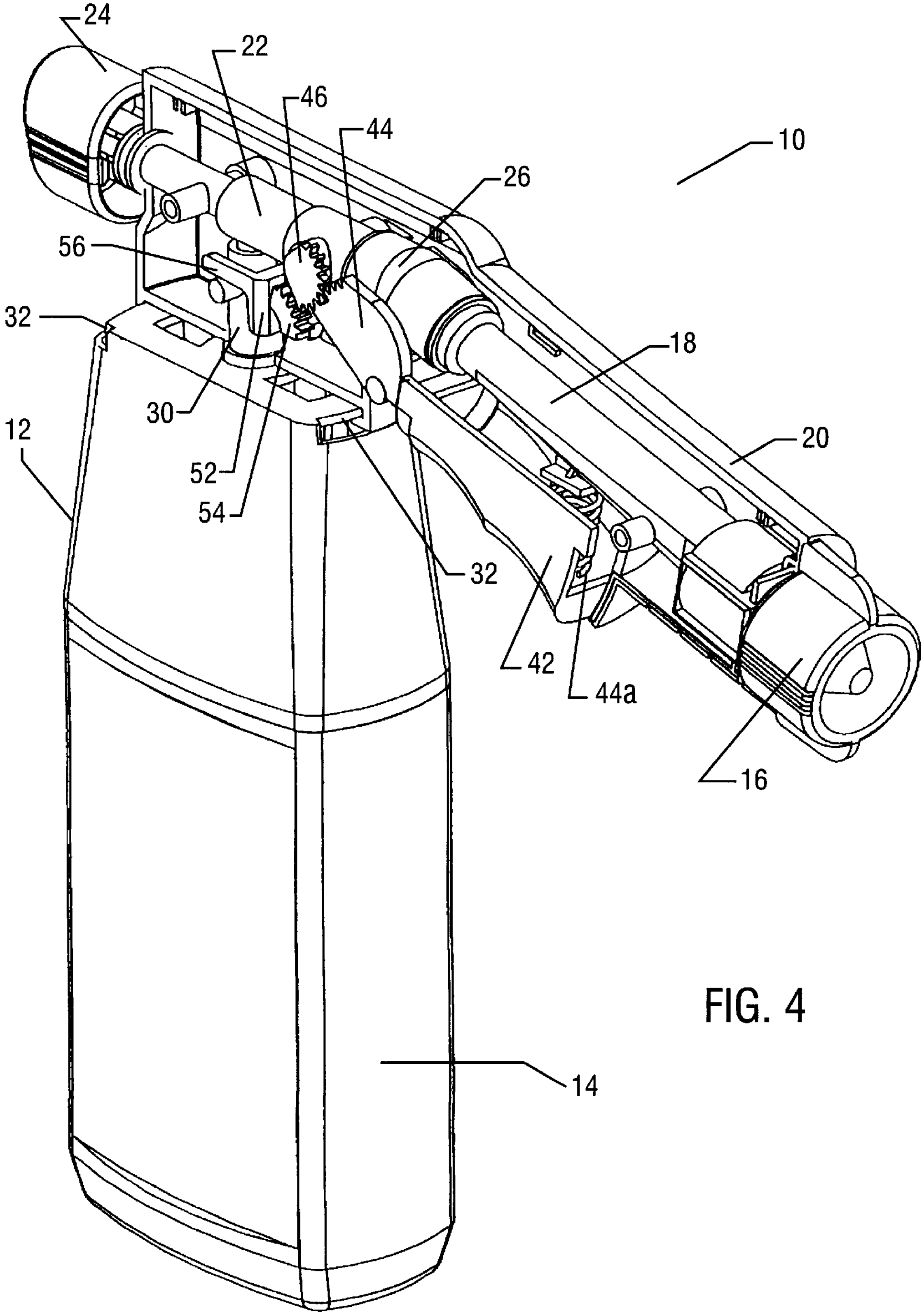
FIG. 4 is a partial cut-away view of the device of FIG. 1.
Figure 5:
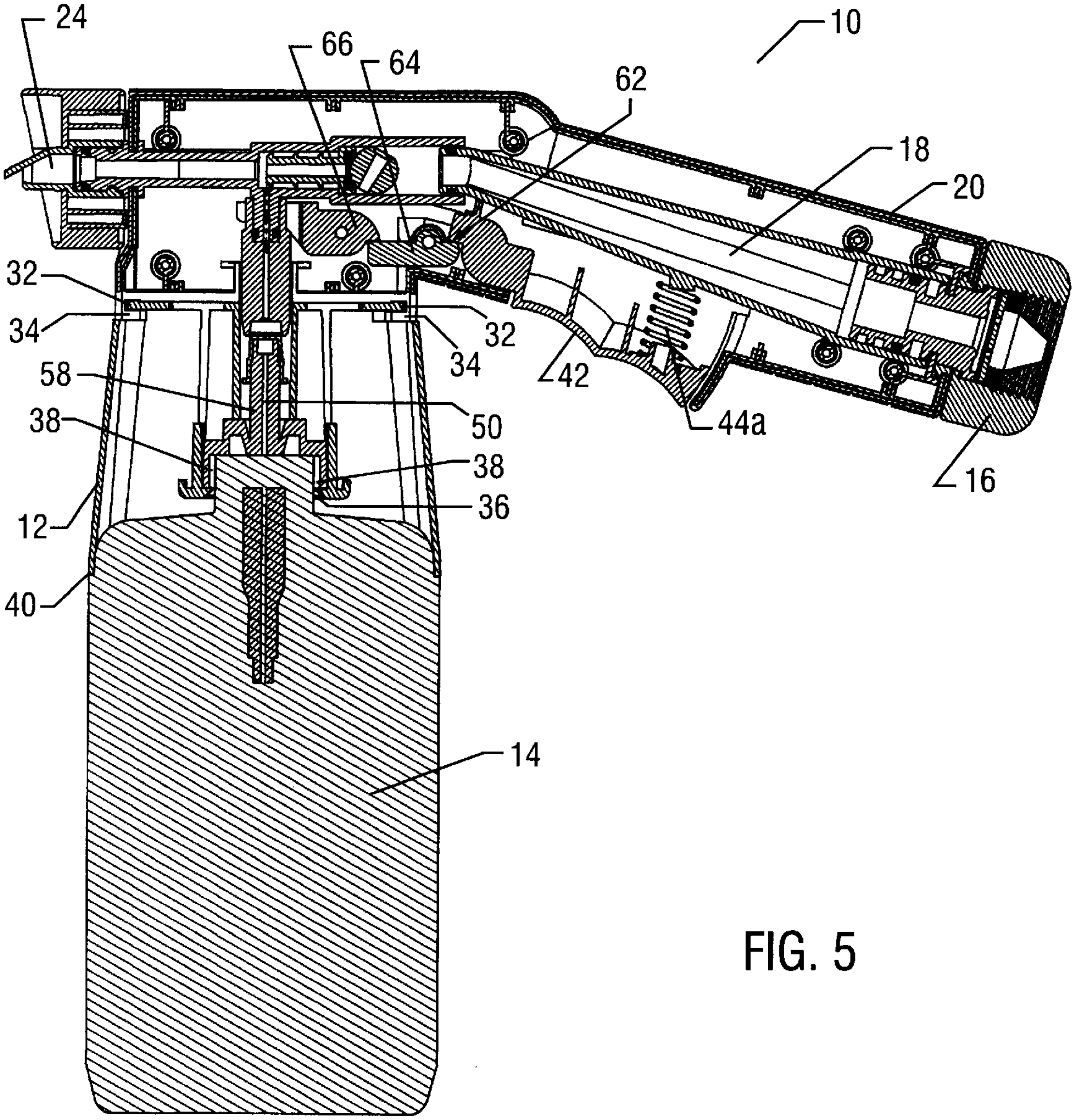
FIG. 5 is a cross-sectional view of the preferred embodiment of the spraying device of the present invention.
Figure 6:
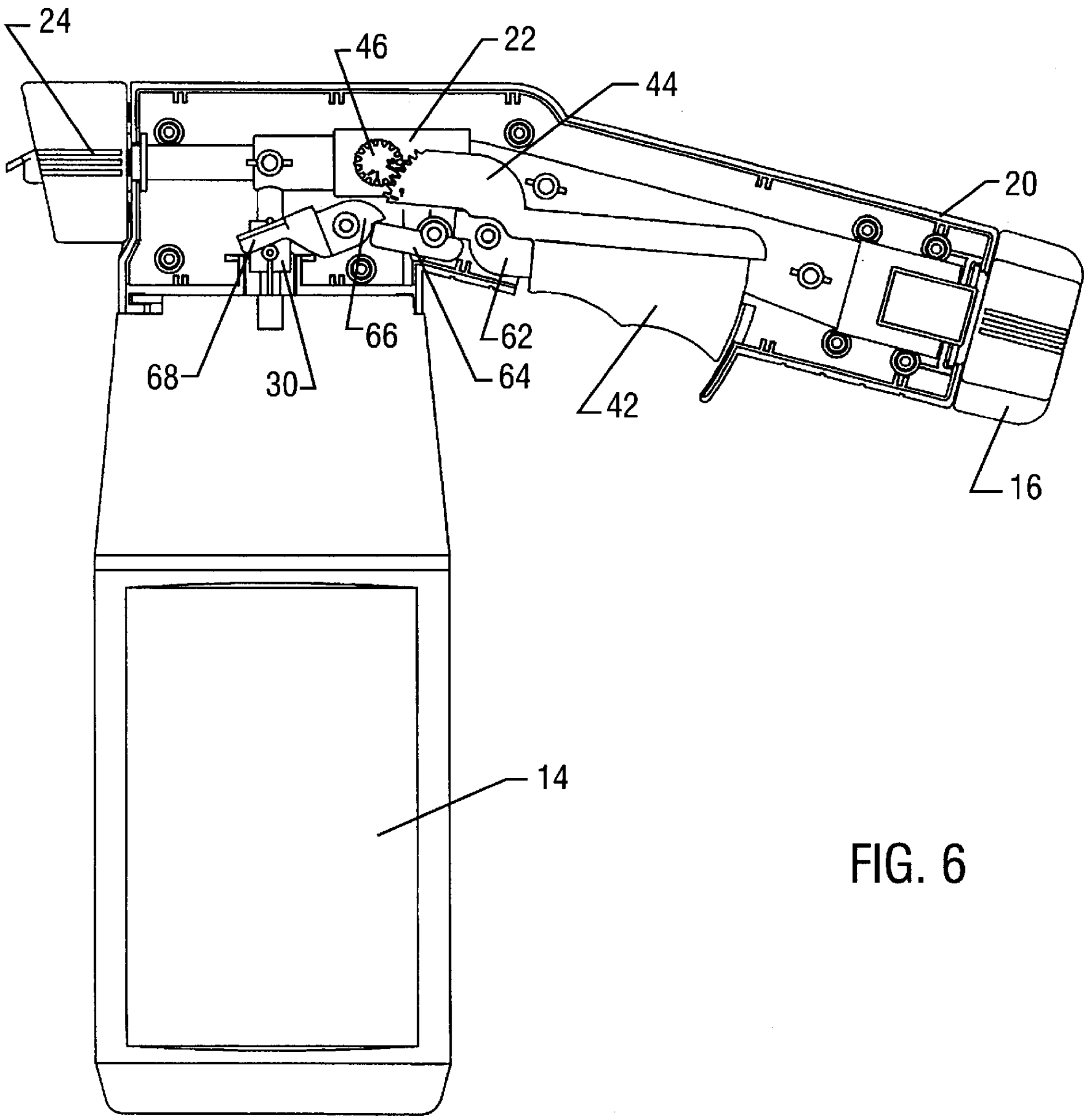
FIG. 6 is a side cut-away view of the preferred embodiment of FIG. 5.
Figure 7:
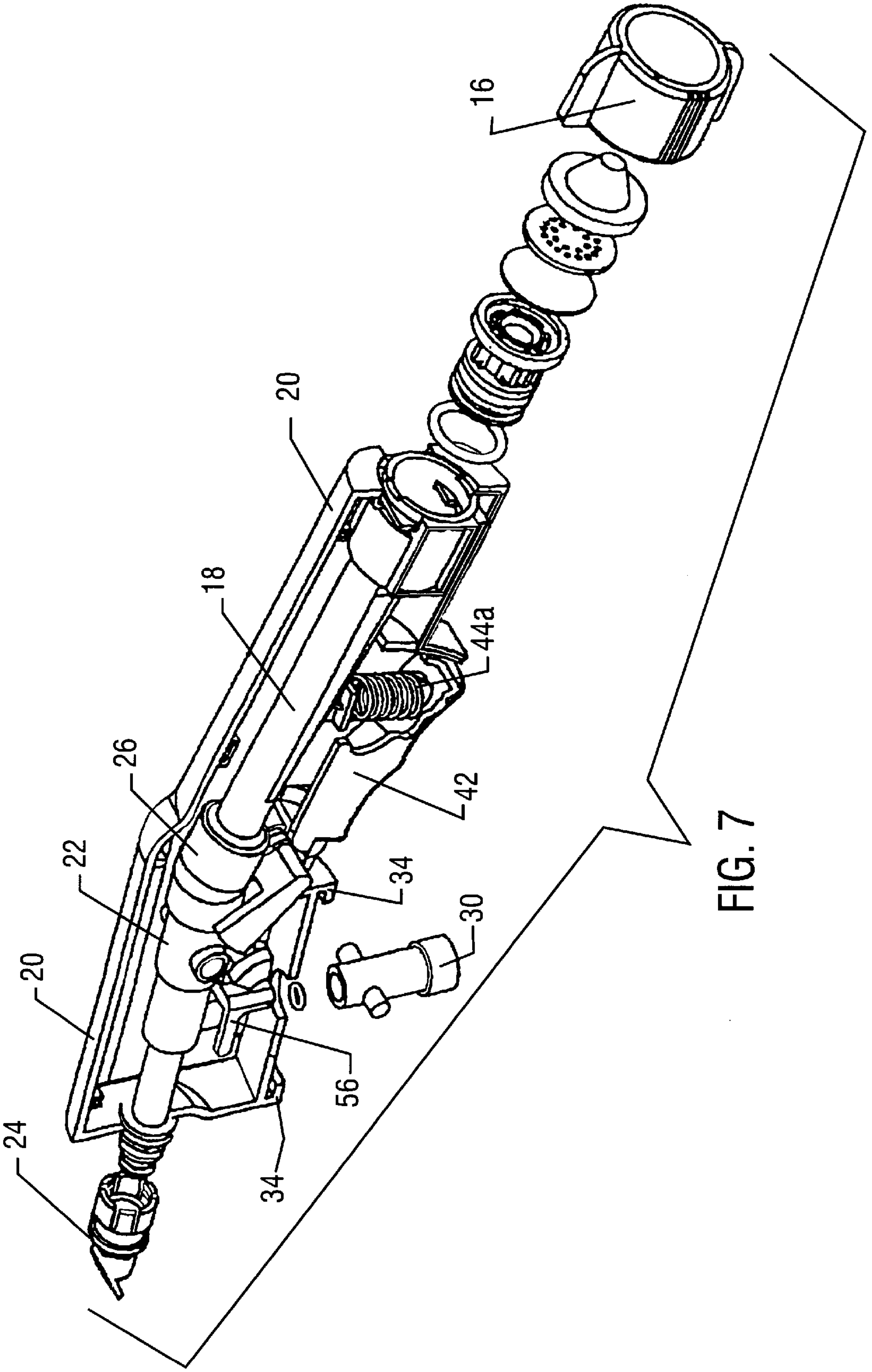
FIG. 7 is an exploded cut-away view of the device of FIG. 1.

Inlet fluid conduit 18 is operatively connected at its second end to the first end of outlet fluid conduit 22, either directly as shown in FIGS. 4 and 5, or by means of a flex tube 26, which can be made of any suitable material. Flex tube 26 simply provides a means of providing fluid communication between inlet fluid conduit 18 and outlet fluid conduit 22 while also providing an angled connection of the conduits in order for the conduits to be in an angled offset relationship, as shown by the letter a in FIG. 1. If a direct connection is used (as shown in FIGS. 4 and 5), then inlet fluid conduit 18 may have a built-in angled offset in order to provide the offset denoted by the letter a. The passage created by hose nut 16, inlet fluid conduit 18, (with or without flex tube 26), outlet fluid conduit 22 and nozzle means 24 provides for fluid communication of the first fluid throughout sprayer head 10.

A cartridge shroud 12 is secured to sprayer head 10 by means of a bayonet fitting which is rotated onto sprayer head 10 using a protruding slider cam 30 as a means of orienting it to sprayer head 10. The bayonet fitting is primarily accomplished by a locking tab arrangement as best shown in FIG. 4. Locking tabs 32 slidably engage and lock into the slots created by U-shaped legs 34 of housing 20. In operation, the user may use slider cam 30 to orient cartridge shroud 12 to sprayer head 10. Once oriented, the operator may rotate cartridge shroud 12 and align locking tabs 32 into the slots formed by legs 34 until locking tabs 32 are secured in place. Cartridge shroud 12 safely covers the sprayer head 10 to cartridge bottle 14 connection.

Figure 3:
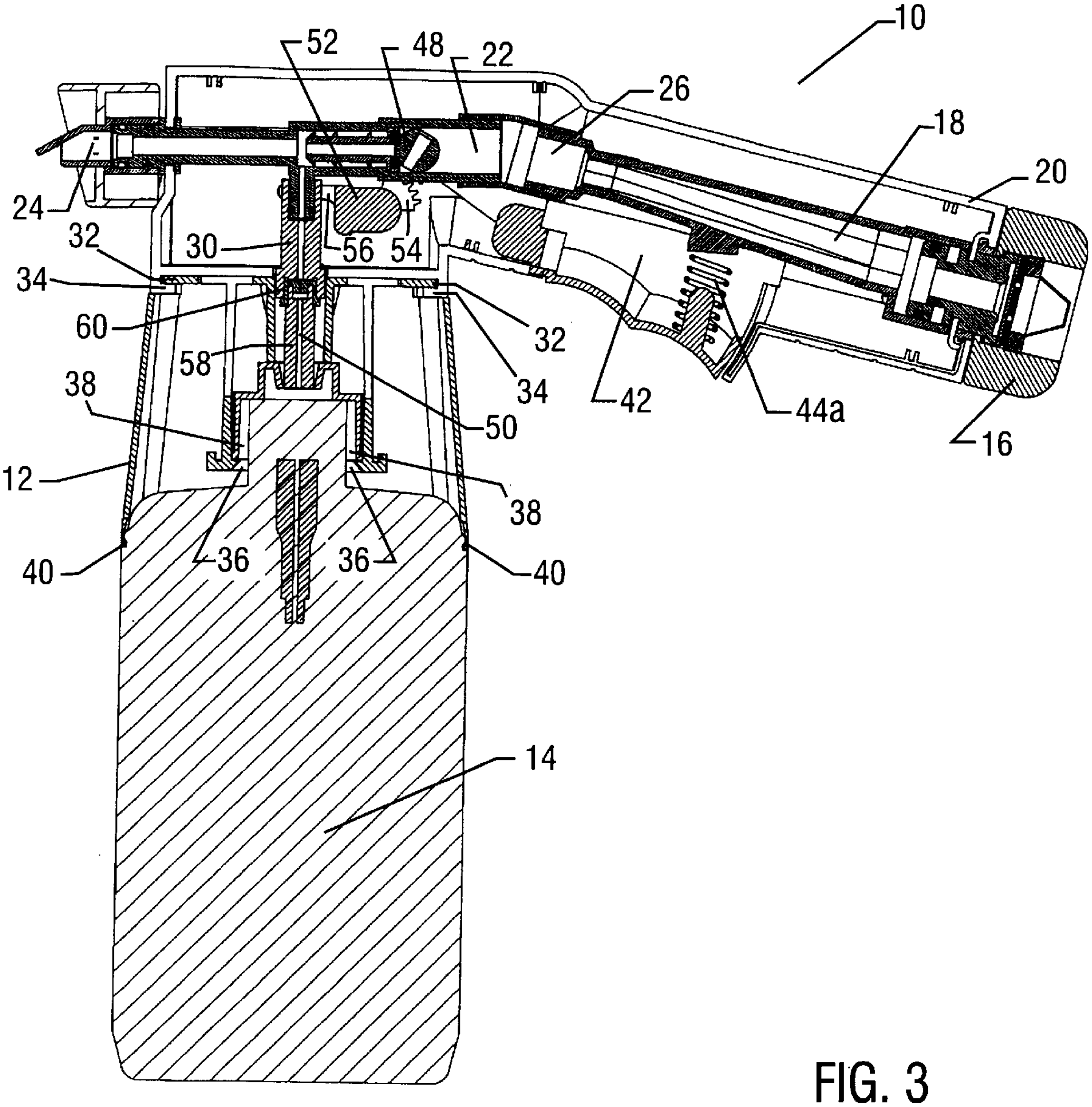
FIG. 3 is a cross-section view of the device of FIG. 1.

Cartridge bottle 14 is an especially useful device for containing a second fluid therein. The second fluid can be any fluid that, when diluted with the first fluid, becomes suitable for discharge into the environment for any of several uses, such as a pesticide, herbicide, insecticide, waxing, or washing product, engine cleaner, road surface cleaner, or fertilizer. As best seen in FIG. 3, cartridge bottle 14 is secured to cartridge shroud 12 by means of locking latches 36 which are secured under valve closure 38 which is threaded on the bottle neck finish. The outer surface of cartridge shroud 12 extends over the outer surface of cartridge bottle 14, and is further secured to cartridge bottle 14 by tabs 40.

The primary purpose of the spraying apparatus of the present invention is to mix the first fluid, such as water, with a predetermined amount of the second fluid, such as a chemical, and dispense the mixture into the environment. A novel feature of the spraying apparatus of the present invention is the way in which the first and second fluids are mixed and dispensed.

The second fluid, typically a chemical, is stored in a closed system in cartridge bottle 14. The second fluid can only be dispensed by the engagement of a trigger 42 when the cartridge bottle 14 is assembled to the mating sprayer head 10. That is, the second fluid remains in a closed system in cartridge bottle 14 even after cartridge bottle 14 is operatively attached to sprayer head 10. Moreover, once cartridge bottle 14 is removed from sprayer head 10, the flow path out of cartridge bottle 14 automatically closes and keeps the second fluid supply within a closed system.

As mentioned above, the first and second fluids are mixed and dispensed by the engagement and activation of trigger 42 by the operator. Trigger 42 is operatively attached to housing 20. Preferably, trigger 42 is generally located under fluid inlet conduit 18. A spring 44*a* biases trigger 42 in a neutral position (pathways for both first and second fluids are closed) until engaged and activated by the operator. Trigger 42 further includes as one piece, or is operatively connected to as a separate piece, trigger gear 44. In either embodiment, movement of trigger 42 causes trigger gear 44 to rotate as trigger 42 is activated by the operator.

As shown in FIGS. 1–4, in one embodiment of the present invention, trigger gear 44 is operatively engaged with valve gear 46 such that, as trigger gear 44 rotates, it causes ball valve gear 46 to likewise rotate. Ball valve gear 46 is operatively connected to valve 48. As best seen in FIG. 3, valve 48 is preferably a ball valve disposed in outlet fluid conduit 22. In a closed position, valve 48 prevents the passage of the first fluid through outlet fluid conduit 22. In a fully rotated, or open position, valve 48 allows the first fluid to flow from inlet fluid conduit 18 into, and through, outlet fluid conduit 22.

As shown in FIG. 3, outlet fluid conduit 22 comprises at least three ends or openings. The first opening is in a fluid communication relationship with inlet fluid conduit 18 by means of flex tube 26. The second opening, or end, is in a fluid communication relationship with nozzle 24. The third end, or opening, of outlet fluid conduit 22 is in fluid communication with the second fluid in cartridge bottle 14 by means of a fluid path 50.

As discussed above, activation of trigger 42 rotates trigger gear 44, which in turn, engages and rotates valve gear 46, which in turn, engages and rotates valve 48 to an open position. Further movement of trigger 42 causes valve gear 46 to further rotate and engage fork gear assembly 52, which primarily comprises a gear 54 and a fork 56. As gear 54 is rotated by valve gear 46, fork 56 is moved, preferably, in a downward or depressed position. As fork 56 moves downwardly, it engages and depresses slider cam 30 in a downward position. As slider cam 30 is depressed by fork gear assembly 52, it depresses, and opens, a metering valve 58 disposed in fluid path 50; thereby opening fluid path 50 and allowing the second fluid to flow into outlet fluid conduit 22. The second fluid is drawn up fluid path 50 by means of a vacuum created in fluid path 50 by the flow of the first fluid in outlet fluid conduit 22. The first and second fluids mix in the outlet fluid conduit 22 prior to dispensing into the environment through nozzle means 24.

As shown in FIGS. 5 and 6, in the preferred embodiment of the present invention, trigger gear 44 is operatively engaged with valve gear 46 such that, as trigger gear 44 rotates, it causes ball valve gear 46 to likewise rotate. Ball valve gear 46 is operatively connected to valve 48. As seen in FIG. 3, valve 48 is preferably a ball valve disposed in outlet fluid conduit 22. In a closed position, valve 48 prevents the passage of the first fluid through outlet fluid conduit 22. In a fully rotated, or open position, valve 48 allows the first fluid to flow from inlet fluid conduit 18 into, and through, outlet fluid conduit 22.

As shown in FIG. 5, outlet fluid conduit 22 comprises at least three ends or openings. The first opening is in a fluid communication relationship with inlet fluid conduit 18 by means of flex tube 26. The second opening, or end, is in a fluid communication relationship with nozzle 24. The third end, or opening, of outlet fluid conduit 22 is in fluid communication with the second fluid in cartridge bottle 14 by means of a fluid path 50.

In addition to causing valve 48 to rotate to an open position, trigger 42 engages cantilever 64. More particularly, trigger 42 has an extension portion 62 that engages one end of cantilever 64. As one end of cantilever 64 is engaged and moved in one direction, the opposite end of cantilever 64 moves in the opposite direction. The opposite end of cantilever 64, in turn, engages and moves cam and fork assembly 66 which also operates in a cantilever fashion. More particularly, as cantilever 64 engages and moves an extension portion of cam and fork assembly 66, fork portion 68 engages and depresses slider cam 30 in a downward position. As slider cam 30 is depressed by fork portion 68 of cam and fork assembly 66, it opens metering valve 58 disposed in fluid path 50; thereby opening fluid path 50 and allowing the second fluid to flow into outlet fluid conduit 22. The second fluid is drawn up fluid path 50 by means of a vacuum created in fluid path 50 by the flow of the first fluid in outlet fluid conduit 22. The first and second fluids mix in the outlet fluid conduit 22 prior to dispensing into the environment through nozzle means 24.

The mix ratio of the first and second fluids is determined by orifice valve 60 preferably affixed to the upper end of metering valve 58. The mix ratio of first fluid to second fluid is predetermined and set by the manufacturer by varying the diameter of orifice adapter 60. In other words, the orifice adapter 60 is premolded and the orifice dimension is established through physical testing by the manufacturer with the particular chemical fluid or product. The end user does not, and in fact, cannot, tamper with, or adjust, the mix ratio. Rather, different cartridge bottles 14 are purchased for different applications. Thus, the concentrations of different chemicals are adjusted to provide the proper mix ratio through the standard orifice diameter of orifice adapter 60.

Release of trigger 42 causes metering valve 58 to close and shut off flow from cartridge bottle 14. As a result, the second fluid, or chemical, remains in a closed system even while cartridge bottle 14 remains assembled to sprayer head 10. Additionally, a closed system is further provided by cartridge shroud 12 which covers the sprayer head and cartridge bottle connection.

What is claimed is:

1. A spraying apparatus comprising:

a spraying head operatively connected to a cartridge bottle, said cartridge bottle containing a second fluid;

said spraying head comprising:

an inlet conduit for receiving a first fluid, said inlet conduit having a first end and a second end;

a trigger;

an outlet conduit having a first end in fluid communication with said second end of said inlet conduit, said outlet conduit having a second end in fluid communication with the environment, and a third end in fluid communication with said second fluid in said cartridge;

a ball valve disposed in said outlet conduit, said ball valve rotating in response to movement of said trigger allowing the passage of said first fluid from said inlet conduit to the environment; and means for opening a fluid path to said second fluid in said cartridge thereby causing said second fluid to mix with said first fluid prior to dispensing of mixture into the environment, said means for opening being responsive to movement of said trigger, and said means comprising a gear assembly, said gear assembly having a first gear engaged and rotated in response to movement of said trigger, said gear assembly having a second gear operatively connected to said ball valve, and a third gear operatively connected to a fork.

2. The spraying apparatus of claim 1 further comprising a cartridge shroud secured to said spraying head at one end, and secured to said cartridge bottle at its other end.

3. The spraying apparatus of claim 2, further comprising a ball valve gear operatively connected to said ball valve.

4. The spraying apparatus of claim 1 wherein movement of said trigger causes said first gear to engage and rotate said second gear, which in turn, engages and rotates said ball valve, further movement of said trigger causes second gear to engage and rotate said third gear, which in turn, opens said path to said second fluid and allows said second fluid to mix with said first fluid prior to dispensing into the environment.

5. The spraying apparatus of claim 4 wherein a metering adapter is disposed in said fluid path to said cartridge bottle, said metering adapter controls the amount of said second fluid to be mixed with said first fluid.

6. The spraying head of claim 2 wherein said cartridge shroud further comprises at least one locking tab to secure said cartridge shroud to said spraying head.

7. The spraying apparatus of claim 1 further comprising a nozzle means which provides a jet spray.

8. The spraying apparatus of claim 1 wherein said cartridge bottle maintains said second fluid as a closed system until said trigger is engaged by the operator.

9. The spraying apparatus of claim 1 further comprising a hose-nut fitting means disposed near said first end of said inlet conduit to reduce any leakage from a source of said first fluid entering said inlet conduit.

10. The spraying apparatus of claim 3 wherein said means for opening a fluid path includes:

said trigger further having a gear operatively engageable with said ball valve gear such that, movement of said trigger opens said ball valve, said trigger further engageable with a cantilever, said cantilever has a first end and a second end such that, in response to movement of said trigger, said trigger engages and moves of said first end of said cantilever in a first direction, thereby moving said second end of said cantilever in a second direction;

a cam and fork assembly having a fork portion, said cam and fork assembly engageable with said cantilever such that said second end of said cantilever engages and moves said cam and fork assembly, said cam and fork assembly is operatively engageable with a metering adapter such that, upon movement, said fork portion engages and depresses said metering adapter thereby dispensing said second fluid from said cartridge bottle into said outlet conduit for mixing with said first fluid and dispensing into the environment.

11. A spraying apparatus comprising:

a spraying head operatively connected to a cartridge bottle, said cartridge bottle containing a second fluid;

said spraying head comprising:

an inlet conduit for a first fluid, said inlet conduit having a first end and a second end;

an outlet conduit having a first end in fluid communication with said second end of said inlet conduit, said outlet conduit having a second end in fluid communication with the environment, and a third end in fluid communication with said second fluid of said cartridge bottle;

a ball valve disposed in said outlet conduit, said ball valve having a ball valve gear;

a trigger having a gear operatively engageable with said ball valve gear such that, movement of said trigger opens said ball valve;

a fork having a gear operatively engageable with said ball valve gear;

a metering adapter for controlling the dispensing of said second fluid from said cartridge bottle into said outlet conduit for mixing with said first fluid and dispensing into the environment; and a means for engaging said metering adapter to cause said second fluid to mix with said first fluid.

12. The spraying apparatus of claim 11 wherein said metering adapter is affixed to an end of an upper valve stem in said cartridge, said metering adapter having a predetermined orifice diameter.

13. The spraying apparatus of claim 11 further comprising a cartridge shroud having a first end and a second end, said first end of said shroud secured to said sprayer head, said second end of said shroud secured to said cartridge.

14. The spraying apparatus of claim 13 wherein said first end of said shroud is secured to said sprayer head by locking tabs and said second end of said shroud secured to said cartridge by locking latches.

15. The spraying apparatus of claim 11 further comprising a slider cam operatively connected to said fork at one end and said metering adapter at its other end.

16. The spraying apparatus of claim 11 wherein movement of said trigger causes said trigger gear to engage and rotate said ball valve gear thereby rotating said ball valve to an open position, said trigger gear also engages and rotates said fork gear thereby mixing said second fluid with said first fluid prior to dispensing into the environment.

17. A spraying apparatus comprising:

a spraying head operatively connected to a cartridge bottle, said spraying head including an inlet fluid conduit for receiving a first fluid from an external source, said cartridge bottle containing a second fluid;

said spraying head further comprising:

an outlet fluid conduit tube in fluid communication with said inlet fluid conduit;

a first valve disposed in said outlet tube;

a means for opening and closing said first valve for providing fluid communication between said inlet and outlet fluid conduits, said means comprising a trigger having a gear operatively engageable with a second gear operatively connected to said first valve;

a second valve for allowing said second fluid to communicate with said first fluid; and a means for opening and closing said second valve.

18. The spraying apparatus of claim 17 wherein said means for opening and closing said second valve further includes a slider cam for opening and closing said second valve.

19. The spraying apparatus of claim 17 further comprising a nozzle means which provides a jet spray.

20. The spraying apparatus of claim 17 wherein said cartridge bottle maintains said second fluid as a closed system until said trigger is engaged by the operator.

21. The spraying apparatus of claim 17 further comprising a hose-nut fitting means disposed near said first end of said fluid inlet fluid to reduce any leakage from a source of said first fluid entering said fluid inlet conduit.

22. A spraying apparatus comprising:

a spraying head operatively connected to a cartridge bottle, said cartridge bottle containing a second fluid;

said spraying head comprising:

an inlet conduit for a first fluid, said inlet conduit having a first end and a second end;

an outlet conduit having a first end in fluid communication with said second end of said inlet conduit, said outlet conduit having a second end in fluid communication with the environment, and a third end in fluid communication with said second fluid of said cartridge bottle;

a ball valve disposed in said outlet conduit, said ball valve having a ball valve gear;

a trigger having a gear operatively engageable with said ball valve gear such that, movement of said trigger opens said ball valve, said trigger further engageable with a cantilever, said cantilever has a first end and a second end such that, in response to movement of said trigger, said trigger engages and moves of said first end of said cantilever in a first direction, thereby moving said second end of said cantilever in a second direction;

a cam and fork assembly having a fork portion, said cam and fork assembly engageable with said cantilever such that said second end of said cantilever engages and moves said cam and fork assembly, said cam and fork assembly is operatively engageable with a metering adapter such that, upon movement, said fork portion engages and depresses said metering adapter thereby dispensing said second fluid from said cartridge bottle into said outlet conduit for mixing with said first fluid and dispensing into the environment.

* * * * *